(12) United States Patent
Chowdhury

(10) Patent No.: US 10,117,047 B1
(45) Date of Patent: Oct. 30, 2018

(54) LOCATION AND TIME BASED APPLICATION MANAGEMENT

(71) Applicant: Amazon Technologies, Inc., Seattle, WA (US)

(72) Inventor: Muhammad Iftekher Chowdhury, North York (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/295,095

(22) Filed: Oct. 17, 2016

Related U.S. Application Data

(63) Continuation of application No. 14/563,052, filed on Dec. 8, 2014, now Pat. No. 9,479,630.

(51) Int. Cl.
| | |
|---|---|
| *H04W 88/02* | (2009.01) |
| *H04W 4/02* | (2018.01) |
| *H04W 8/18* | (2009.01) |
| *H04L 29/06* | (2006.01) |
| *H04L 12/24* | (2006.01) |

(52) U.S. Cl.
CPC .............. *H04W 4/02* (2013.01); *H04L 69/28* (2013.01); *H04W 8/18* (2013.01); *H04L 41/22* (2013.01); *H04W 88/02* (2013.01)

(58) Field of Classification Search
CPC ............ G06Q 10/06398; H04L 67/325; G06F 17/30053; H04M 1/72522
USPC .......................... 455/418; 705/7.42; 718/102
See application file for complete search history.

(56) References Cited

U.S. PATENT DOCUMENTS

| | | | |
|---|---|---|---|
| 7,925,525 B2 | 4/2011 | Chin | |
| 8,073,590 B1 | 12/2011 | Zilka | |
| 8,078,397 B1 | 12/2011 | Zilka | |
| 8,284,727 B2 | 10/2012 | Song et al. | |
| 9,479,630 B1* | 10/2016 | Chowdhury | ...... H04M 1/72522 |
| 2003/0045322 A1 | 3/2003 | Baer et al. | |
| 2006/0009243 A1 | 1/2006 | Dahan et al. | |
| 2008/0034011 A1* | 2/2008 | Cisler | ............... G06F 17/30053 |
| 2008/0090560 A1 | 4/2008 | Bouzid et al. | |
| 2008/0146189 A1 | 6/2008 | Doumi et al. | |
| 2009/0209254 A1 | 8/2009 | Oguchi | |
| 2009/0228318 A1* | 9/2009 | Ara | .................. G06Q 10/06398 |
| | | | 705/7.42 |
| 2011/0201358 A1 | 8/2011 | Karaoguz et al. | |
| 2013/0045729 A1 | 2/2013 | Haik et al. | |
| 2013/0055273 A1* | 2/2013 | Hong | .................... H04L 67/325 |
| | | | 718/102 |
| 2014/0079043 A1 | 3/2014 | Montemurro et al. | |
| 2014/0309804 A1 | 10/2014 | Ricci | |

(Continued)

OTHER PUBLICATIONS

USPTO; Office Action for U.S. Appl. No. 14/563,052, dated Feb. 3, 2016.

*Primary Examiner* — William D Cumming
(74) *Attorney, Agent, or Firm* — Lowenstein Sandler LLP

(57) ABSTRACT

An application manager on a user device determines a current time period and determines that the current time period corresponds to a previous time period when the user device has previously been used to access one or more application files. The application manager identifies previous state information for the user device corresponding to a previous state of the user device during the previous time period and restores a current state of the user device to the previous state based at least in part on the previous state information.

20 Claims, 9 Drawing Sheets

(56) References Cited

U.S. PATENT DOCUMENTS

2014/0309865 A1 10/2014 Ricci
2014/0309866 A1 10/2014 Ricci
2014/0309867 A1 10/2014 Ricci
2014/0310277 A1 10/2014 Ricci \* cited by examiner

| Application Manager Database 360 | | |
|---|---|---|
| App ID | Time | Location |
| 2514 | 19:45:37 07/22/14 | 40.665, -74.097 |
| Word® | 08:30 – 9:55 | Home |

LOCATION AND TIME BASED APPLICATION MANAGEMENT

RELATED APPLICATIONS

This application is a continuation of U.S. patent application Ser. No. 14/563,052, filed Dec. 8, 2014, the entire contents of which are hereby incorporated by reference herein.

BACKGROUND

A large and growing population of users enjoys entertainment through the consumption of media items, including electronic media, such as electronic books (also referred to herein as ebooks), electronic newspapers, electronic magazines, other electronic publications, audio books, and digital video. Users employ various electronic devices to consume such media items. Among these electronic devices are electronic book readers, cellular telephones, personal digital assistants (PDAs), portable media players, tablet computers, electronic pads, netbooks, desktop computers, notebook computers, and the like. These electronic devices also offer a platform for the execution of applications, such as entertainment applications, productivity applications, business applications, social networking applications or other types of applications.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

FIG. 7 is a diagram illustrating an application manager database, according to an embodiment.

DETAILED DESCRIPTION

Figure 1:
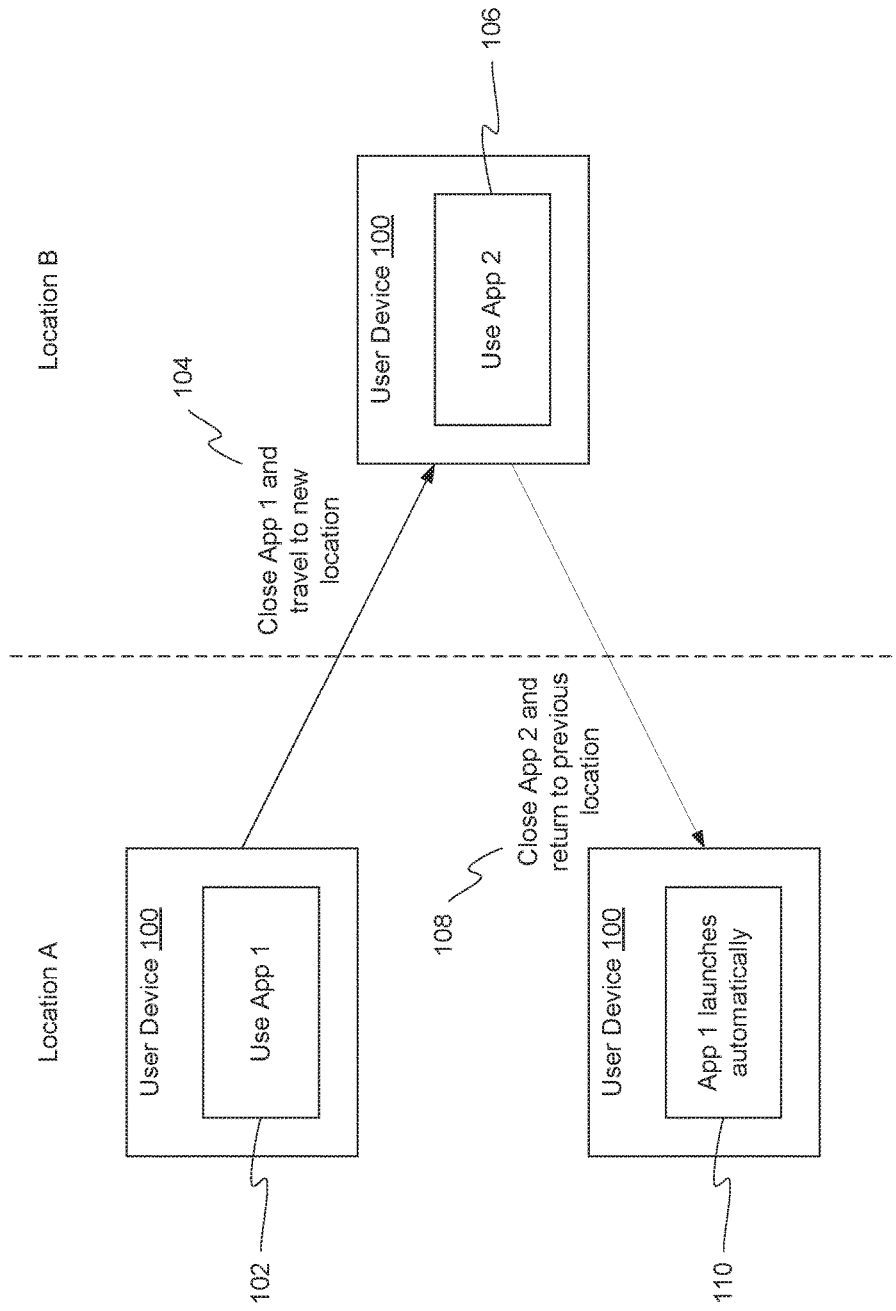
FIG. 1 is a block diagram illustrating location based application management on a user device, according to an embodiment.

Embodiments are described for location and time based application management on a user device. The particular applications or application files that a user may access on their user device (e.g., smartphone, tablet, laptop) may vary depending on the location where the device is used. For example, a user may access a particular set of applications (e.g., email, calendar, word processor) when he is at his office, but a different set of applications when he is at home (e.g., video game, media player). In one embodiment, in response to some trigger event, including a wake-up event, such as activating the user device, unlocking the user device, turning on the user device, powering up the user device, waking the user device from a sleep or low power mode, or launching a particular application, an application manager on the user device may determine the current location of the user device and identify stored state information corresponding to the current location. The stored device state information may include records indicating which applications were accessed on the user device, recognized locations at which the applications were accessed, and time periods during which the applications were accessed. Using the state information the application manager can automatically restore the state of the user device to the previous state, including launching any applications and loading any application files that were previously or typically used at the same location. In one embodiment, the automatic restoring of the device state may occur without any intervention from the user. Thus, the user may not have to specifically request that the previously used applications be launched. Rather, the application manager may initiate the restoring simply as a result of the user device returning to a previous recognized location.

In another embodiment, the application manager may present a user interface that includes previous locations where the device was used and previous time periods when the device was used. The user may select one of these locations or time periods, even if it is different than the current location, and the application manager may restore the state of the device to that of the selected location or time period. In another embodiment, the application manager may recommend applications or programs to the user based on the location of the user device. For example, the application manager may provide a list of applications that are popular among other users at the same location. These recommendations may include applications already on the user device or new applications that the user can obtain from an application provider.

By providing the ability to restore the device state to a previous state based on location or time, the application manager can improve the user experience on the device by preventing the user from constantly having to open and close applications. Similarly, the user may also be notified of new and potentially useful or entertaining applications used by others at the same location, of which the user may not have previously been aware.

FIG. 1 is a block diagram illustrating location based application management on a user device, according to an embodiment. In one embodiment, user device 100 is first located at Location A. Location A, for example, may be the user's workplace. At Location A, a user uses 102 Application 1 on user device 100. Application 1, for example, may be a word processing application or other productivity application. At that time, an application manager running on user device 100 records state information of the user device for Location A, including an indication that Application 1 was accessed at Location A and a time period during which Application 1 was accessed at Location A.

Subsequently, in one embodiment, the user closes Application 1 on user device 100 and travels 104 to Location B. Location B, for example, may be the user's home. At Location B, the user accesses 106 Application 2 on user device 100. Application 2, for example, may be a media player application or other entertainment application. At that time, the application manager running on user device 100 records state information of the user device for Location B, including an indication that Application 2 was accessed at Location B and a time period during which Application 2 was accessed at Location B.

In one embodiment, at some later time (e.g., the next day), the user closes Application 2 and returns 108 to the previously visited Location A. Upon returning to Location A, and perhaps in response to some trigger event, including a wake-up event, such as activating the user device, unlocking the user device, turning on the user device, powering up the user device, waking the user device from a sleep or low power mode, or launching a particular application, the application manager on user device 100 may determine the current location (i.e., Location A) of user device 100 and identify any stored device state information corresponding to the current location. The stored device state information may include records indicating which applications (e.g., Application 1) were previously accessed on user device 100 at Location A. Using the device state information, the application manager can automatically restore the state of the user device to the previous state, including relaunching Application 1 and loading any application files identified in the device state information without any intervention from the user.

Figure 2:
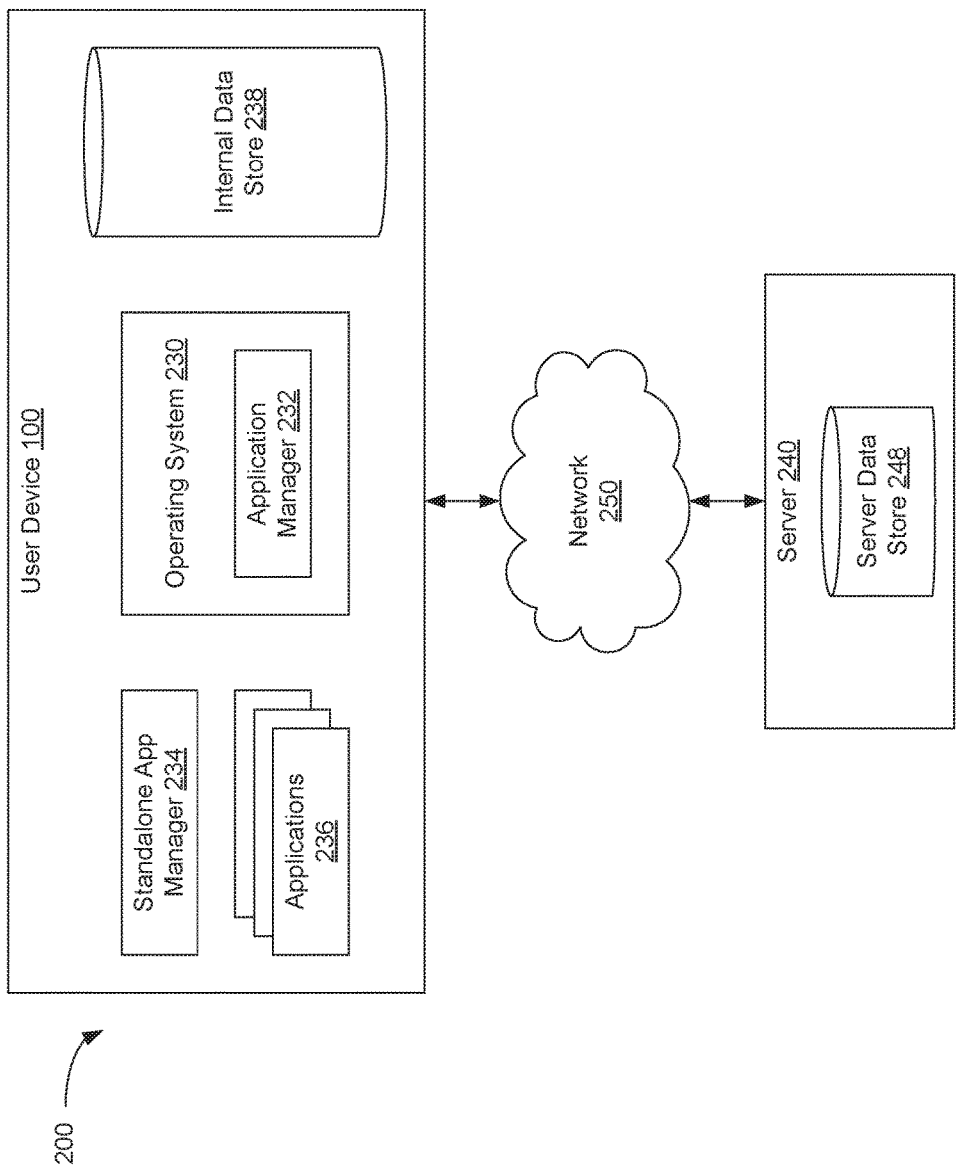
FIG. 2 is a block diagram illustrating an example network architecture in which embodiments of the present disclosure may be implemented.

FIG. 2 is a block diagram illustrating an example network architecture 200 in which embodiments of the present disclosure may be implemented. The network architecture 200 may include one or more user devices 100 communicating with one or more servers, such as server 240 over one or more networks represented by network 250, according to one embodiment. Network 250 can be a local area network (LAN), a wireless network, a telephone network, a mobile communications network, a wide area network (WAN), such as the Internet, or similar communication system. Server 240 may include a network-accessible server-based functionality, various data stores, and/or other data processing equipment. Server 240 may be implemented by a single machine or a cluster of machines. Server 240 may be hosted, for example, by computer system 900 of FIG. 9. In one embodiment, server 240 hosts server data store 248. Server data store 248 can be a remote, or cloud-based, data store that is used to synchronize local data stores, such as internal data store 238, across various user devices, including user device 100 and other devices.

User device 100 may be any type of computing device including a server computer, gateway computer, desktop computer, laptop computer, mobile communications device, cell phone, smart phone, hand-held computer, tablet computer, or similar computing device. User device 100 may be variously configured with different features to enable viewing of content and resources, and the execution of one or more applications. In one embodiment, user device 100 includes an operating system 230, an optional standalone application manager program 234, one or more other applications 236, and internal data store 238.

Operating system 230 may include a set of programs that manage hardware resources of user device 100 and provide common services for applications, such as applications 236 running on user device 100. In one embodiment, operating system 230 may include a kernel to control low-level processes, such as how memory is read and written, the order in which processes are executed, how information is received and sent by user device 100, to control any peripheral devices, such as a monitor, keyboard, mouse, touch screen, etc. and how to interpret information received over networks. Operating system 230 may additionally include a user interface to interact with a user of user device 100, allowing the user to control and use applications 236. In one embodiment, the user interface may be graphical with icons and a desktop or home screen, such as a launcher, which may be accessed by the user, for example, using a touch screen display. In one embodiment, the available applications 236 may be displayed as part of the launcher. In addition, operating system 230 may include application programming interfaces (APIs) to provide services and code libraries that let application developers write modular code reusing well defined programming sequences in user space libraries or in the operating system 230 itself. In one embodiment, where user device 100 is a mobile computing device, such as a tablet, the operating system 100 may be the ANDROID™ operating system from Google Inc. of Mountain View, Calif. In other embodiments, operating system 100 may be some other mobile or non-mobile operating system, such as iOS™ from Apple Inc., or Windows Phone™ from Microsoft.

Applications 236 may include software programs that cause user device 100 to perform useful tasks beyond the running of the computer itself. Applications 236 may include various types of programs, including for example, content access applications, such as media players, entertainment applications, such as video games, general productivity and information retrieval applications, such as email, calendar, contacts, stock market or weather information applications, social networking applications, or other types of applications.

In one embodiment, operating system 230 includes application manager 232. In other embodiments, application manager 234 may be a standalone application. The description that follows will be provided with respect to the embodiment, where application manager 232 is integrated into operating system 230. It should be understood, however, that the description may apply equally to the embodiment, where application manager 234 is a standalone application running on top of user device 100. Application manager 232 may be designed to maintain a database of information, such as device state information, in internal data store 238. When one of applications 236 is launched or otherwise activated, or when one of applications 236 loads a particular application file, application manager 232 may record an indication of the application or application file, an indication of the location of the user device, and an indication of the time period when the access occurred.

In response to some trigger event, such as a wake-up event occurring at a given location, application manager 232 may determine the current location of user device 100 and identify state information corresponding to the current location that is stored in internal data store 238. The stored device state information may include records indicating which applications were accessed on user device 100, recognized locations at which the applications were accessed, and time periods during which the applications were accessed. Using the state information, application manager 232 can automatically restore the state of user device 100 to the previous state, including launching any applications and loading any application files that were previously or typically used at the same location. Additional details of application manager 232 are provided below.

Figure 3:
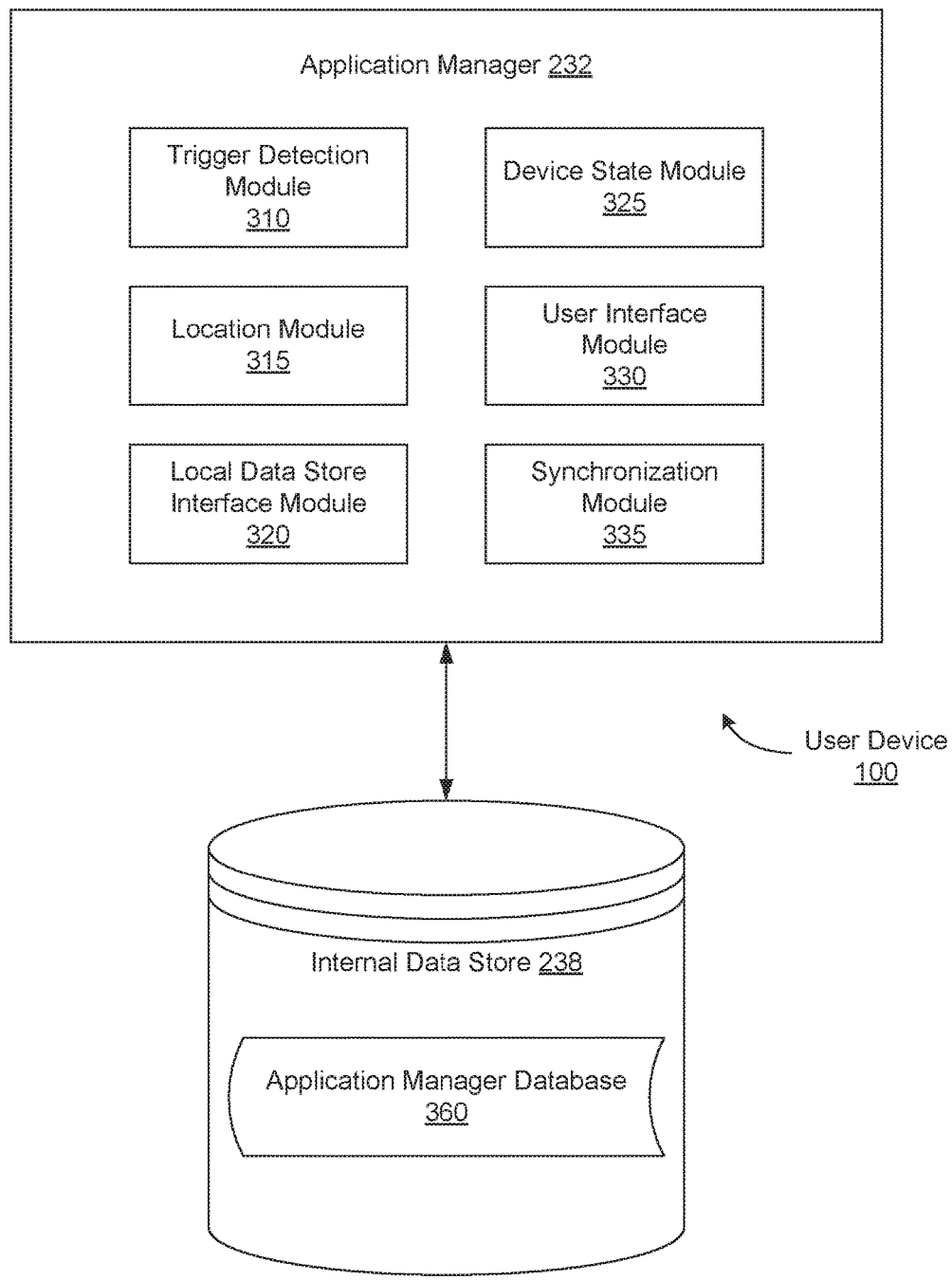
FIG. 3 is a block diagram illustrating an application manager, according to an embodiment.

FIG. 3 is a block diagram illustrating an application manager 232 that is included in user device 100, according to an embodiment. In one embodiment, application manager 232 includes trigger detection module 310, location module 315, local data store interface module 320, device state module 325, user interface module 330 and synchronization module 335. This arrangement of modules and components may be a logical separation, and in other embodiments, these modules or other components can be combined together or separated in further components, according to a particular embodiment. In one embodiment, internal data store 238 is connected to application manager 232 and includes application manager database 360. In one embodiment, application manager 232 may be part of operating system 230, as shown in FIG. 2. In one embodiment, user device 100 may include both application manager 232 and internal data store 238. In another embodiment, the data store may be external to user device 100 and may be connected to user device 100 over a network or other connection. In other embodiments, application manager 232 may include different and/or additional components which are not shown to simplify the description. Internal data store 238 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, trigger detection module 310 detects a trigger event that initiates an application management process. The trigger event may be configurable but may include, for example, unlocking the user device, turning on the user device, powering up the user device, waking the user device from a sleep or low power mode, activation of the user device, the launch of a particular application, the arrival at a given location, etc. In one embodiment, trigger detection module 310 monitors user device 100 to determine whether a triggering condition has occurred.

In one embodiment, location module 315 obtains location information from a positioning system on user device 100. The positioning system may include a receiver to communicate with a navigation system, such as the Global Positioning System (GPS), to determine a location of the user device 100. In other embodiments, the positioning system may determine the location of user device 100 based on an Internet Protocol (IP) address, a Message Authentication Code (MAC) address, radio-frequency identification (RFID), Wi-Fi connection location, or by some other means. The positioning system may determine the location of user device 100 using a set of universal coordinates, such as latitude and longitude. In one embodiment, user device 100 may be a device that the user has with them most of the time (e.g., a smartphone), such that the location of user device 100 can usually be associated with the location of the user.

In one embodiment, local data store interface module 320 manages application manager database 360 in internal data store 238. Local data store interface module 320 can create entries in application manager database 360 for device state information or other information associated with a given application 236. In one embodiment, local data store interface module 320 may use location information determined by location module 315 to identify a corresponding entry or record in application manager database 360. For example, local data store interface module 320 may consult application manager database 360 to determine, using the current location, whether an entry or record corresponding to the location is present. Furthermore, local data store interface module 320 may add, remove or modify data in the entries of application manager database 360. One example implementation of application manager database 360 is shown in FIG. 7. Additional details of application manager database 360 are provided below.

In one embodiment, device state module 325 can set or restore the state of user device 100 using state information obtained from application manager database 360. In one embodiment, setting or restoring the state of user device 100 may include relaunching previously used applications and loading previously accessed application files identified in the device state information that are associated with the current location of user device 100.

In one embodiment, user interface module 330 generates and presents a user interface to enable interaction between application manager 232 and a user of user device 100. In one embodiment, user interface module 330 receives user input, such as a selection of a location, time period, application, application file, etc., entered using an input device (e.g., a touchscreen). User interface module 330 may provide that information to local data store interface module 320 for storage in application manager database 360 or to device state module 325 for use in setting or restoring the device state. In one embodiment, user interface module 330 may present user selectable options including, for example, locations where and time periods when user device 100 was previously used to access certain applications, and may receive a user selection of one or more of those options.

In one embodiment, synchronization module 335 controls synchronization of application manager database 360 with a copy on server data store 248. In one embodiment, once local data store interface module 320 makes changes to application manager database 360, local data store interface module 320 notifies synchronization module 335 of the changes. In response to this notification, synchronization module 335 may propagate the changes to server data store 248 over network 250. In one embodiment, synchronization module 335 provides only the entries in application manager database 360 that were changed (e.g., an incremental update). In another embodiment, synchronization module 335 may provide a copy of the entire application manager database 360. In one embodiment, synchronization module 335 may synchronize with server data store 248 in response to changes to application manager database or after some threshold period of time has passed since the last synchronization. The synchronization may include any process, such as the copy or transfer of data, to ensure consistency between application manager database 360 and server data store 248.

Figure 4:
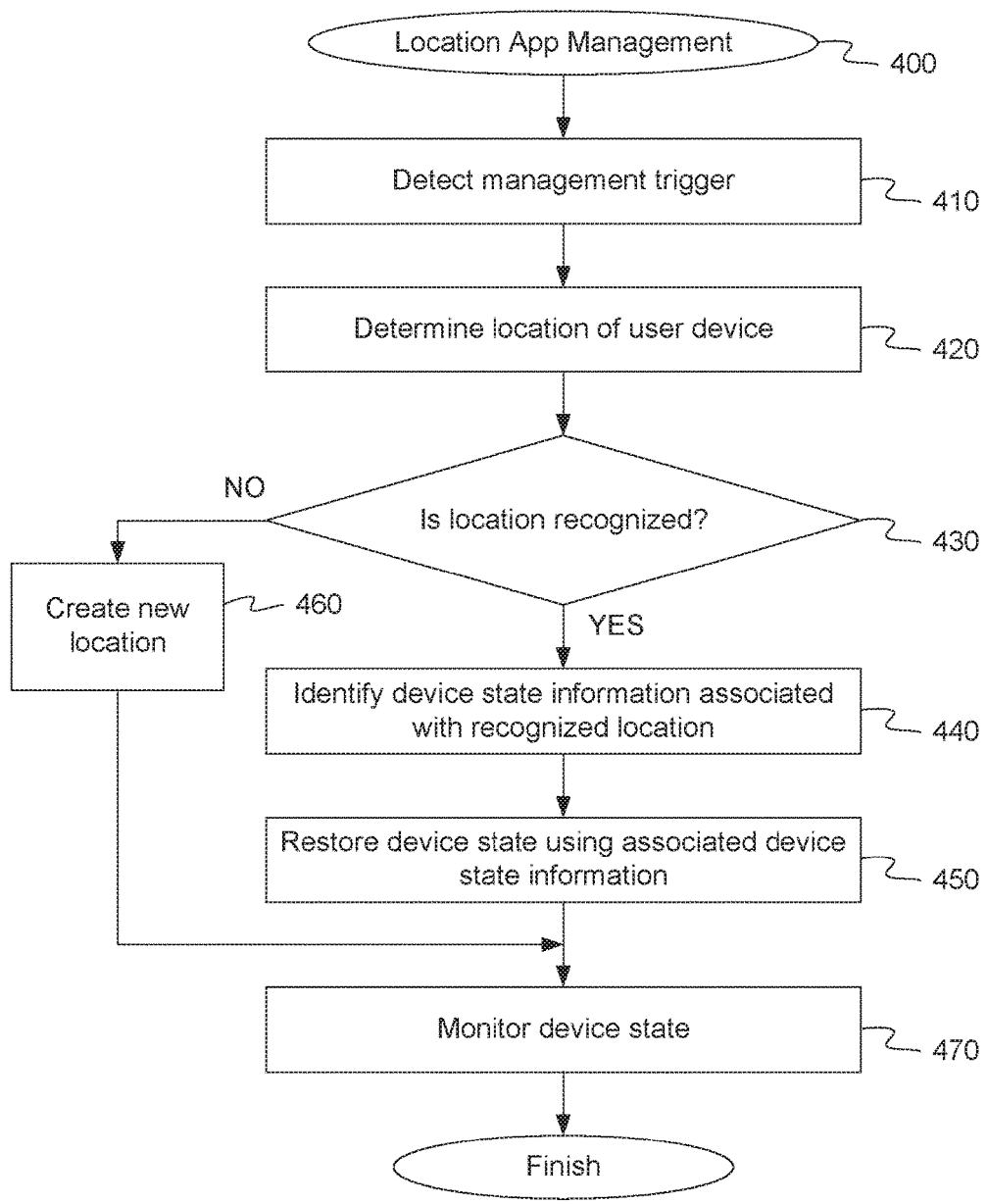
FIG. 4 is a flow diagram illustrating a location based application management method, according to an embodiment.

FIG. 4 is a flow diagram illustrating a location based application management method, according to an embodiment. The method 400 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to automatically restore the state of a user device, including launching previously accessed applications and loading application data, based on a location where the device was previously used, when the user device is later returned to that same location. In one embodiment, method 400 may be performed by application manager 232, as shown in FIGS. 2 and 3.

Referring to FIG. 4, at block 410, method 400 detects a management trigger event. In one embodiment, trigger detection module 310 detects a trigger event that initiates an application management process. The trigger event may be configurable but may include, for example, unlocking the user device, turning on the user device, powering up the user device, waking the user device from a sleep or low power mode, activation of the user device, the launch of a particular application, the arrival at a given location, etc. In one embodiment, trigger detection module 310 monitors user device 100 to determine whether a triggering condition has occurred.

At block 420, method 400 determines the current location of user device 100. In one embodiment, location module 315 obtains location information from a positioning system on user device 100. The positioning system may include a receiver to communicate with a navigation system, such as the Global Positioning System (GPS), to determine a location of the user device 100. In other embodiments, the positioning system may determine the location of user device 100 based on an Internet Protocol (IP) address, a Message Authentication Code (MAC) address, radio-frequency identification (RFID), Wi-Fi connection location, or by some other means.

At block 430, method 400 determines whether the current location of user device 100 is recognized. In one embodiment, local data store interface module 320 may consult application manager database 360 to determine, using the current location, whether an entry corresponding to the current location is present. If an entry corresponding to the current location is already present in application manager database 360, application manager 232 determines that the current location is a recognized location.

FIG. 7 shows example entries in application management database 360. In one embodiment, local data store interface module 320 may compare the current location determined by location module 315 to the location field 706 to determine if a match is found. The location specified in location field 706 may be stored as a recognized name (e.g., "Home") as shown in entry 710, as a pair of GPS or other location coordinates as shown in entry 720, or any other location identifier. If the current location matches the information stored in the location field 706, local data store interface module 320 can determine that the entry corresponds to the current location and that the current location is a recognized location. If the remaining fields (e.g., application field 702, time field 704) of the entry are populated with non-null values, local data store interface module 320 can determine that state information is available. In one embodiment, application field 702 indicates the application (e.g., one of applications 236) that was accessed at the location specified in location field 706 of the corresponding entry. The application specified in application field 702 may be stored as a numeric identifier as shown in entry 710, as a recognized application name as shown in entry 720, or any other application identifier. Each entry may also have a time period stored in time field 704 that indicates the period of time when the application specified in application field 702 was accessed at the location specified in location field 706. The time specified in time field 704 may be expressed as the start time and date of the access, as shown in entry 710, as a range of times during which the access occurred, as shown in entry 720, or as any other date and/or time identifier.

Returning to FIG. 4, if the current location is a recognized location, at block 440, method 400 identifies device state information associated with the recognized location. In one embodiment, local data store interface module 320 reads the other fields, such as application field 702 for the entry having a value representing the current location in location field 706. The device state information may include, for example, an indication of which applications were accessed on user device 100, recognized locations at which the applications were accessed, and time periods during which the applications were accessed.

At block 450, method 500 restores a current state of the user device to a previous state using the identified device state information. In one embodiment, device state module 325 restores the device state, for example, by relaunching any applications and reloading any application files that were previously or typically used at the same location. In one embodiment, the restoring of the device state may occur without any intervention from the user.

If at block 430, method 400 determines that the current location is not a recognized location, at block 460, method 400 creates a new location. In one embodiment, local data store interface module 320 creates a new entry in application manager database 360 corresponding to the new location and at block 470, method 400 monitors and records device state information corresponding to the new location. In one embodiment, device state module 325 keeps track of what applications and application files are accessed at the new location and local data store interface module 320 records an indication of such in the new entry in application manager database 360 corresponding to the new location. In one embodiment, method 400 continues to monitor the device state information even after restoring the device state at block 450. In this manner, if the device state continues to change, the recorded device state information will be up to date and accurate and can be used the next time the device state is restored.

Figure 5:
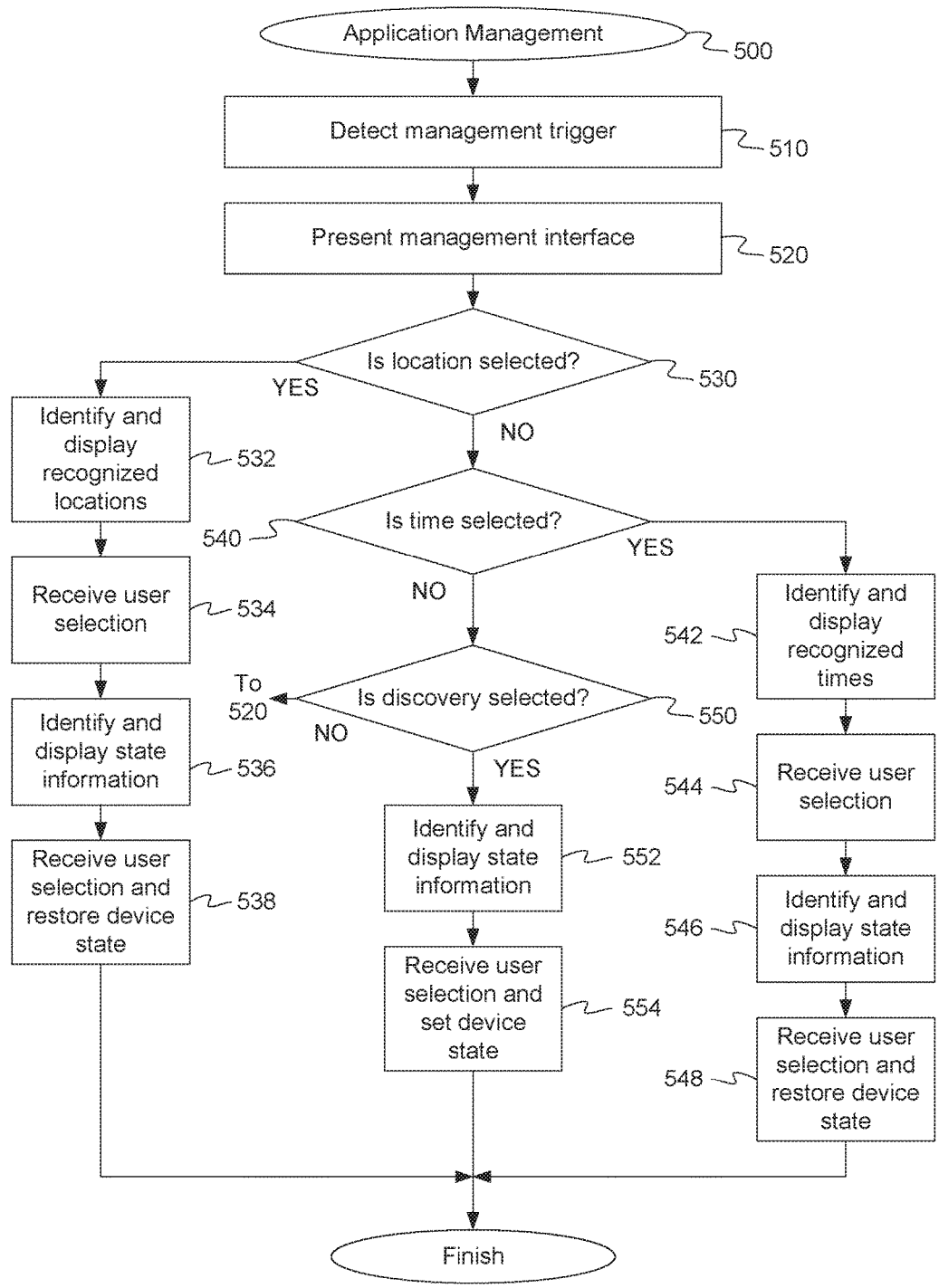
FIG. 5 is a flow diagram illustrating an application management method, according to an embodiment.

FIG. 5 is a flow diagram illustrating an application management method, according to an embodiment. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to restore the state of a user device, including launching previously accessed applications and loading application data, from a location where or a particular time period when the device was previously used, when the user selects a location or time period from a provided user interface. In one embodiment, method 500 may be performed by application manager 232, as shown in FIGS. 2 and 3.

Referring to FIG. 5, at block 510, method 500 detects a management trigger event. In one embodiment, trigger detection module 310 detects a trigger event that initiates an application management process. The trigger event may be configurable but may include, for example, unlocking the user device, turning on the user device, powering up the user device, waking the user device from a sleep or low power mode, activation of the user device, the launch of a particular application, the arrival at a given location, etc. In one embodiment, trigger detection module 310 monitors user device 100 to determine whether a triggering condition has occurred.

At block 520, method 500 presents a management interface. In one embodiment, user interface module 330 generates and presents a user interface to enable interaction between application manager 232 and a user of user device 100. In one embodiment, user interface module 330 may present user selectable options including, for example, locations where and time periods when user device 100 was previously used to access certain applications, and may receive a user selection of one or more of those options.

In one embodiment, user interface module 330 further receives user input, such as a selection of a location, time period, application, application file, etc., entered using an input device (e.g., a touchscreen).

Referring again to FIG. 5, at block 530, method 500 determines if a location interface is selected. In one embodiment, the location interface displays one or more locations where user device 100 was previously used. At block 532, method 500 identifies and displays one or more recognized locations. In one embodiment, local data store interface module 320 accesses application manager database 360 and determines all of the locations which have a corresponding entry in application manager database 360. User interface module 330 generates a user interface to present the identified locations to the user. The locations may be presented in different formats, such as in a list, on a map, etc. At block 534, method 500 receives a user selection of one of the presented locations and at block 536, method 500 identifies and displays stored device state information corresponding to the selected location. In one embodiment, local data store interface module 320 accesses the entries in corresponding application manager database 360 corresponding to the selected location and identifies the applications and application files that were accessed at the location as well as the time periods during which they were accessed. In one embodiment, method 500 automatically restores the device state based on the determined state information. In another embodiment, at block 538, method 500 receives a user selection of one or more applications or application files to restore and relaunches them accordingly.

At block 540, method 500 determines if a time interface is selected. In one embodiment, the time interface displays one or more time periods when user device 100 was previously used. At block 542, method 500 identifies and displays one or more recognized time periods. In one embodiment, local data store interface module 320 accesses application manager database 360 and determines all of the time periods which have a corresponding entry in application manager database 360. User interface module 330 generates a user interface to present the identified time periods to the user. The time periods may be presented in different formats, such as in a list, on a timeline, etc. At block 544, method 500 receives a user selection of one of the presented time periods and at block 546, method 500 identifies and displays stored device state information corresponding to the selected location. In one embodiment, local data store interface module 320 accesses the entries in corresponding application manager database 360 corresponding to the selected time period and identifies the applications and application files that were accessed during the time period as well as the locations at which they were accessed. In one embodiment, method 500 automatically restores the device state based on the determined state information. In another embodiment, at block 548, method 500 receives a user selection of one or more applications or application files to restore and relaunches them accordingly.

At block 550, method 500 determines if an application discovery interface is selected. In one embodiment, at block 552, the application discovery interface displays one or more recommended applications or application files based on the location of user device 100. For example, application manager 232 may provide a list of applications that are popular among other users at the same location. These recommendations may include applications already on the user device or new applications that the user can obtain from an application provider. At block 554, method 500 receives a user selection of one or more applications or application files and launches or loads them accordingly.

Figure 6:
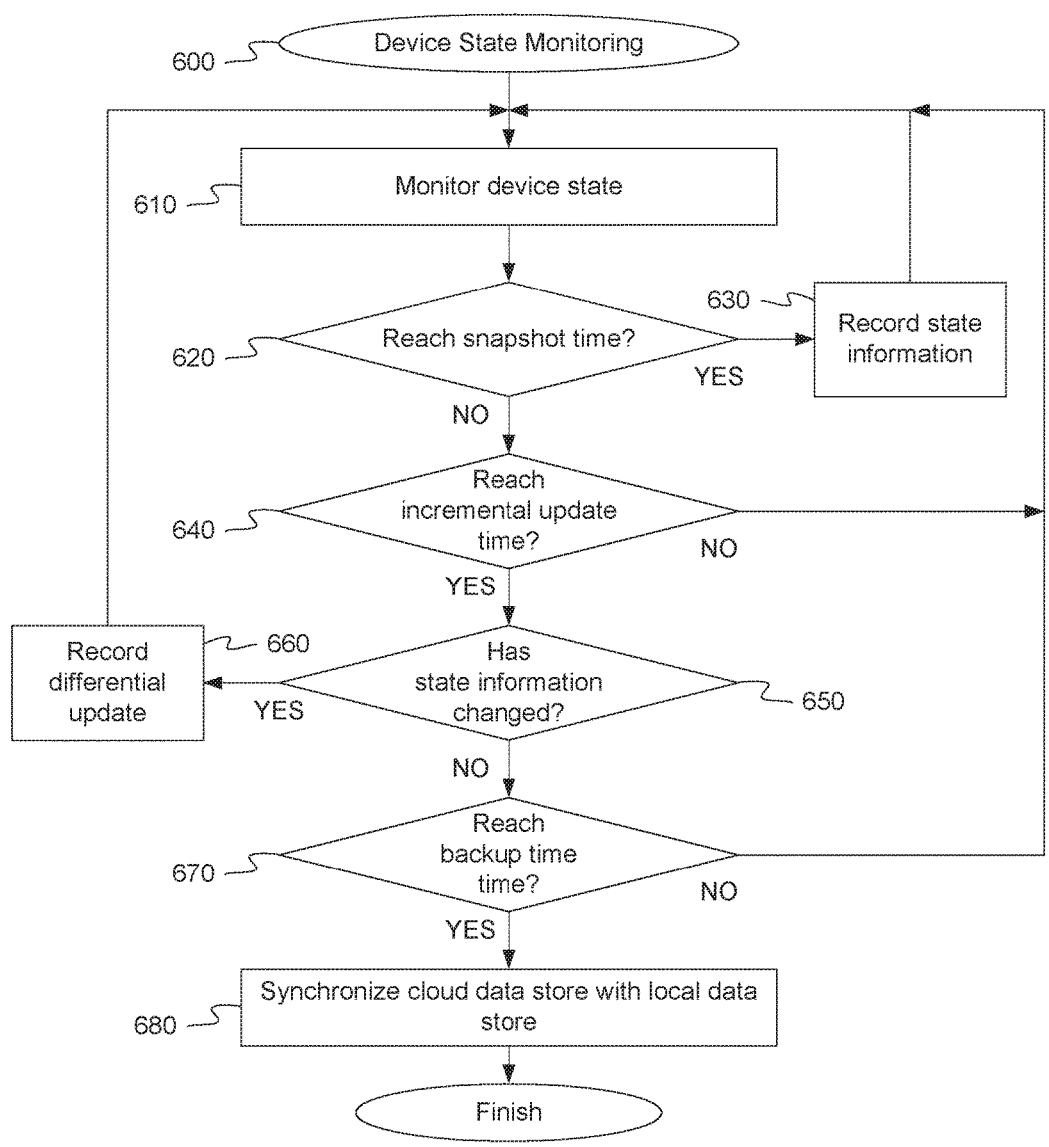
FIG. 6 is a flow diagram illustrating a device state monitoring method, according to an embodiment.

FIG. 6 is a flow diagram illustrating a device state monitoring method, according to an embodiment. The method 600 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to monitor a device state and record state information including which applications were accessed on the user device, recognized locations at which the applications were accessed, and time periods during which the applications were accessed. In one embodiment, method 600 may be performed by application manager 232, as shown in FIGS. 2 and 3.

Referring to FIG. 6, at block 610, method 600 monitors the current state of user device 100. In one embodiment, device state module 325 keeps track of what applications are accessed on user device 100, the locations where those applications are accessed and the time periods during which they are accessed.

At block 620, method 600 determines if a snapshot time has been reached. The snapshot time may be a configurable parameter that occurs periodically to indicate that the current device state information should be recorded. In one embodiment, the period between snapshot times is set to one hour. In other embodiments, the snapshot time may be configured to some other value. If the snapshot time has been reached, at block 630, method 600 records the current state information. In one embodiment, device state module 325 may provide this state information to local data store interface module 320 to be recorded in a corresponding entry of application manager database 360.

If the snapshot time has not yet been reached, at block 640, method 600 determines if an incremental update time has been reached. The incremental update time may be a configurable parameter that occurs periodically to indicate that an incremental update to the device state information should be recorded. In one embodiment, the period between incremental update times is set to one minute. In other embodiments, the incremental update time may be configured to some other value. If the incremental update time has been reached, at block 650, method 600 determines if the state information has changed. In one embodiment, device state module 325 determines if there has been any change to the location of the device or the applications or application files that have been accessed. If this state information has changed, at block 660, method 600 records a differential update to the device state information. In one embodiment, local data store interface module 320 modifies an existing entry of application manager database 360 with the new state information.

If the incremental update time has not yet been reached, at block 670, method 600 determines if a server backup time has been reached. The server backup time may be a configurable parameter that occurs periodically to indicate that the state information in application manager database 360 on internal data store 238 should be synchronized with server data store 248. In one embodiment, the period between backup times is set to 24 hours. In other embodiments, the backup time may be configured to some other value. If the backup time has been reached, at block 680, method 600 synchronizes the server data store 248 with internal data store 238. In one embodiment, synchronization module 335 may provide a copy of the entire application manager database 360. The synchronization may include any process, such as the copy or transfer of data, to ensure consistency between application manager database 360 and server data store 248.

Figure 8:
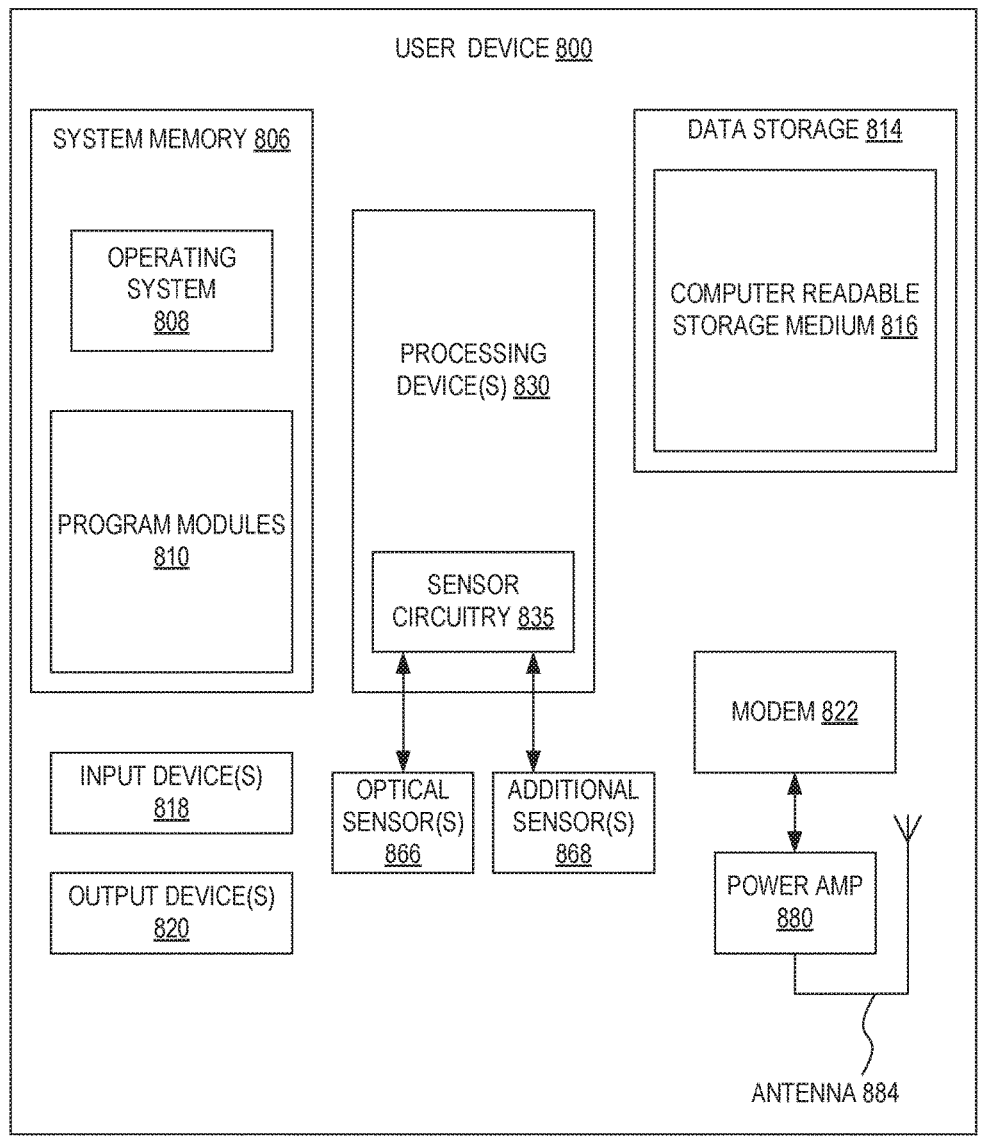
FIG. 8 is a block diagram illustrating an example user device, according to an embodiment.

FIG. 8 is a block diagram illustrating an example user device 800, according to an embodiment. In one embodiment, the user device 800 may correspond to user device 100 of FIG. 2 and may be any type of user device such as an electronic book reader, a PDA, a mobile phone, a laptop computer, a portable media player, a tablet computer, an electronic pad, a desktop computer, a camera, a video camera, a netbook, and the like.

The user device 800 includes one or more processing devices 830, such as one or more CPUs, microcontrollers, field programmable gate arrays, or other types of processors. The user device 800 also includes system memory 806, which may correspond to any combination of volatile and/or non-volatile storage mechanisms. The system memory 806 stores information which provides an operating system component 808, various program modules 810, and/or other components. The user device 800 performs functions by using the processing device(s) 830 to execute instructions provided by the system memory 806.

The user device 800 also includes a data storage device 814 that may be composed of one or more types of removable storage and/or one or more types of non-removable storage. The data storage device 814 includes a computer-readable storage medium 816 on which is stored one or more sets of instructions embodying any one or more of the methodologies or functions described herein. As shown, the instructions may reside, completely or at least partially, within the computer readable storage medium 816, system memory 806 and/or within the processing device(s) 830 during execution thereof by the user device 800, the system memory 806 and the processing device(s) 830 also constituting computer-readable media. The user device 800 may also include one or more input devices 818 (keyboard, mouse device, specialized selection keys, etc.) and one or more output devices 820 (displays, printers, audio output mechanisms, etc.).

The user device 800 further includes a wireless modem 822 to allow the user device 800 to communicate via a wireless network (e.g., such as provided by the wireless communication system) and/or with other computing devices, such as remote computers including server 240, and so forth. The wireless modem 822 may allow the user device 800 to handle both voice and non-voice communications (such as communications for text messages, multimedia messages, media downloads, web browsing, etc.) over network 250. The wireless modem 822 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, etc. The wireless modem 822 may generate signals and send these signals to power amplifier (amp) 880 for amplification, after which they are wirelessly transmitted via antenna 884. In addition to sending data, antenna 884 also receives data, which is sent to wireless modem 822 and transferred to processing device(s) 830.

In one embodiment, user device 800 includes an optical sensor 866. The optical sensor 866 may be a low resolution camera (e.g., having 0.2 or 0.3 Megapixels) that takes images (e.g., of a user's eyes) on a periodic basis. Alternatively, the optical sensor 866 may have a higher resolution, such as 1 Megapixel up to 10 or more Megapixels. In one embodiment, user device 800 includes one or more additional sensors 868 including sensors that aid in location and time determination.

The processing device(s) 830 may include sensor circuitry 835 (e.g., sensor device drivers) that enables the processing device (s) 830 to interpret signals received from the optical sensor(s) 866 and/or additional sensors 868. In one embodiment, the optical sensors 866 and/or additional sensors 868 output raw sensor data. In another embodiment, the optical sensors 866 and/or additional sensors 868 output fully processed signals to the processing device (s) 830. In either instance, the processing device 830 may use the sensor circuitry 835 to process and/or interpret the received data. If data is received from multiple sensors, processing the data may include averaging the data, identifying a maximum from the data, or otherwise combining the data from the multiple sensors.

Figure 9:
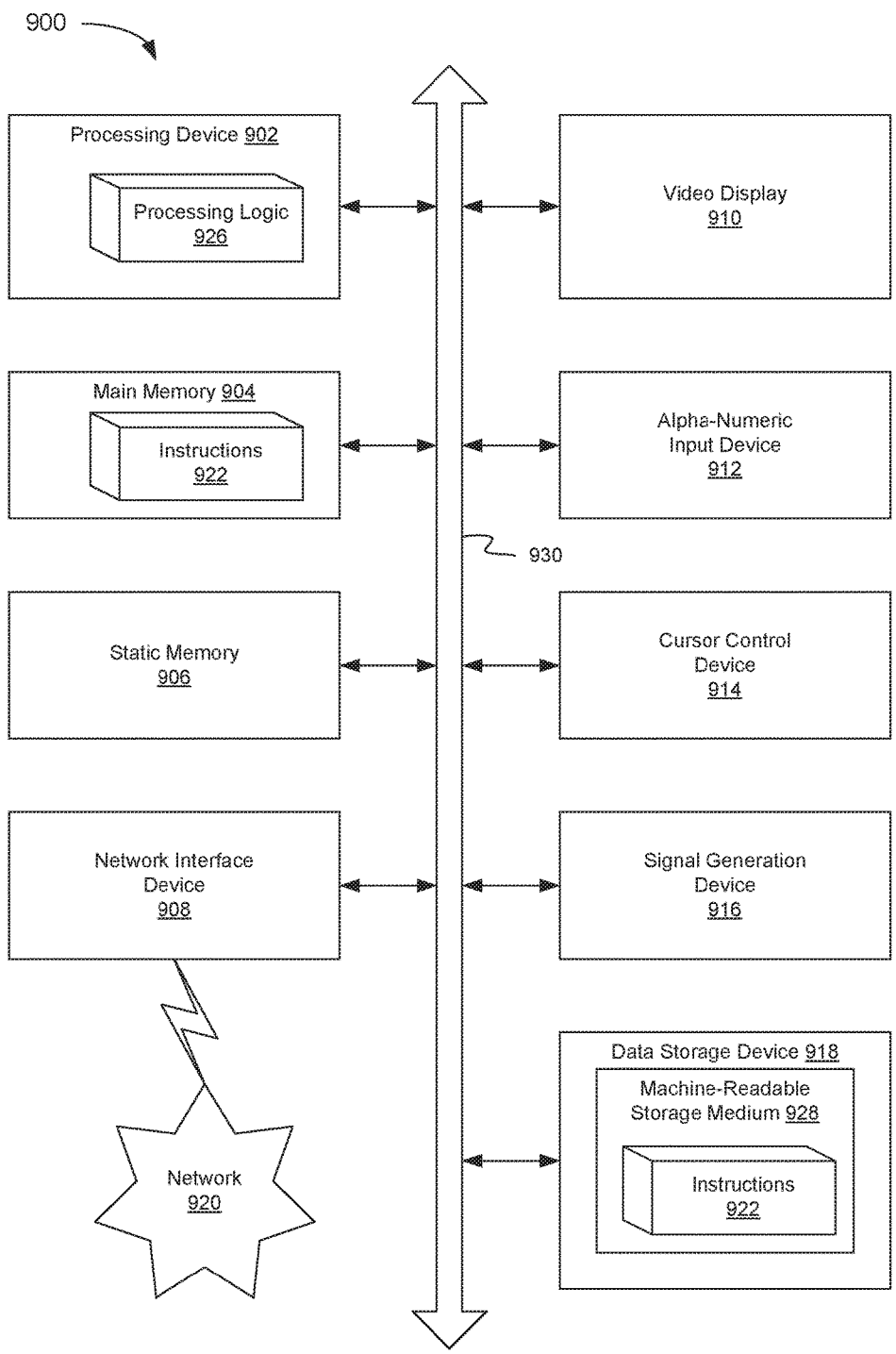
FIG. 9 is a block diagram illustrating an example computer system, according to an embodiment.

FIG. 9 illustrates a diagrammatic representation of a machine in the example form of a computer system 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may represent server 240 and/or user device 100 of FIG. 2.

The example computer system 900 includes a processing device (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute the application manager 232 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable medium 928 on which is stored one or more sets of instructions 922 (e.g., instructions of application manager 232) embodying any one or more of the methodologies or functions described herein. The instructions 922 may also reside, completely or at least partially, within the main memory 904 and/or within processing logic 926 of the processing device 902 during execution thereof by the computer system 900, the main memory 904 and the processing device 902 also constituting computer-readable media. The instructions may further be transmitted or received over a network 920 via the network interface device 908.

While the computer-readable storage medium 928 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely examples. Particular implementations may vary from these example details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   detecting an occurrence of a wake-up event on a user device;
   determining a first time;
   determining that the first time corresponds to one or more previous time periods when the user device has previously been used;
   identifying, by a processing device, one or more application files that were previously accessed on the user device during the one or more previous time periods;
   presenting an application interface with the one or more application files;
   receiving a selection of at least one of the one or more application files; and
   launching the at least one of the one or more application files on the user device.

2. The method of claim 1, further comprising:
   monitoring application usage on the user device; and
   maintaining a data store with records indicating which of the one or more application files were accessed on the user device and corresponding time periods during which the application files were accessed.

3. The method of claim 1, wherein launching the at least one of the one or more application files restores a current state of the user device to a previous state associated with the one or more previous time periods.

4. The method of claim 1, further comprising:
   identifying the one or more previous time periods when the user device has previously been used by accessing a data store and identifying time periods having a corresponding entry with application file information in the data store.

5. The method of claim 1, wherein presenting a time interface with the one or more previous time periods comprises presenting a list of the previous time periods.

6. The method of claim 1, wherein presenting a time interface with the one or more previous time periods comprises presenting a timeline displaying the previous time periods.

7. A user device comprising:
a memory to store one or more applications, an operating system comprising an application manager, and an application manager data store; and
a processing device operatively coupled to the memory, the processing device to:
determine a first time;
determine that the first time corresponds to a first pervious time period when the user device was previously used to access the one or more applications;
identify previous state information for the user device corresponding to a previous state of the user device during the first previous time period, the previous state information comprising an application file that was previously accessed by the one or more applications on the user device during the first previous time period; and
restore a current state of the user device to the previous state as indicated in the previous state information.

8. The user device of claim 7, wherein the application manager data store comprises records indicating one or more accessed application files on the user device and time periods during which the accessed application files were accessed.

9. The user device of claim 8, wherein to determine that the first time corresponds to the first previous time period, the processing device to identify a record in the application manager data store corresponding to the first previous time period.

10. The user device of claim 7, wherein to restore the current state of the user device to the previous state, the processing device to relaunch the application file, as specified in the previous state information.

11. The user device of claim 7, wherein the processing device further to:
determine that the first time does not correspond to a second previous time period; and
create a new record in the application manager data store to record state information for the user device corresponding to the first time.

12. The user device of claim 7, wherein the processing device further to:
present an application interface with one or more application files including the application file;
receive a selection of the application file; and
launch the application file on the user device.

13. A method comprising:
detecting a launch of an application on a user device;
determining a first time;
determining, by a processing device, that the first time corresponds to a first pervious time period when the application has been previously accessed on the user device by identifying a record in an application manager data store corresponding to the first previous time period;
identifying a first application file that was previously accessed by the application during the first previous time period; and
loading the first application file in the application on the user device.

14. The method of claim 13, wherein the application manager data store comprises records indicating which application files were accessed on the user device and time periods during which the application files were accessed.

15. The method of claim 13, wherein identifying the first application file that was previously accessed by the application during the first previous time period comprises identifying the record in the application manager data store corresponding to the first previous time period.

16. The method of claim 13, further comprising:
determining that the first time does not correspond to a second previous time period; and
creating a new record in an application manager data store to record state information for the user device corresponding to the first time.

17. The method of claim 16, wherein the state information comprises one or more applications that are used on the user device at the first time and one or more application files that are accessed by the one or more applications on the user device at the first time.

18. The method of claim 13, wherein a second application file was accessed by the application during a different time period subsequent to the first application file being previously accessed by the application during the first previous time period.

19. The method of claim 13, further comprising:
loading the first application file in the application on the user device without user intervention.

20. The method of claim 13, further comprising:
presenting an application interface with the first application file; and
receiving a selection of the first application file.

* * * * *